(12) United States Patent
Oxley et al.

(10) Patent No.: US 7,108,096 B1
(45) Date of Patent: Sep. 19, 2006

(54) VEHICLE CONTROL SYSTEM WITH SLOW-IN-TURN CAPABILITIES AND RELATED METHOD

(75) Inventors: Lonnie R. Oxley, Versailles, KY (US); Jeff K. Arnold, Lexington, KY (US)

(73) Assignee: Lonmore, LC, Means, KY (US)

( * ) Notice: Subject to any disclaimer, the term of this patent is extended or adjusted under 35 U.S.C. 154(b) by 147 days.

(21) Appl. No.: 10/374,234

(22) Filed: Feb. 25, 2003

Related U.S. Application Data

(60) Provisional application No. 60/359,387, filed on Feb. 25, 2002, provisional application No. 60/390,266, filed on Jun. 20, 2002, provisional application No. 60/398,155, filed on Jul. 24, 2002.

(51) Int. Cl.
*B60K 28/16* (2006.01)

(52) U.S. Cl. .................. 180/197; 180/6.32; 180/6.24; 280/91.1

(58) Field of Classification Search .............. 180/170, 180/171, 174, 176, 168, 6.32, 6.2, 6.34, 65.8, 180/65.3, 65.5, 65.6, 408, 409, 410, 411, 180/445; 701/93, 95, 96, 65, 110, 121
See application file for complete search history.

(56) References Cited

U.S. PATENT DOCUMENTS

| 759,559 | A | * | 5/1904 | Scott ......................... 180/6.32 |
|---|---|---|---|---|
| 1,984,399 | A | | 12/1934 | Davidson |
| 2,659,445 | A | | 11/1953 | Church |
| 2,886,118 | A | | 5/1959 | Strunk |
| 3,305,116 | A | | 2/1967 | McKee |
| 3,384,194 | A | | 5/1968 | Newhouse |
| 3,698,498 | A | | 10/1972 | Stanford |
| 4,154,314 | A | | 5/1979 | Tsuji et al. |
| 4,175,638 | A | | 11/1979 | Christensen |
| 4,189,706 | A | * | 2/1980 | Knox ......................... 180/171 |
| 4,328,876 | A | | 5/1982 | Horsch |
| 4,331,208 | A | | 5/1982 | Kolthoff et al. |
| 4,345,488 | A | | 8/1982 | Reed |
| 4,371,002 | A | | 2/1983 | Tischer |
| 4,431,077 | A | * | 2/1984 | Burney ....................... 180/176 |
| 4,499,964 | A | * | 2/1985 | Abe et al. ................... 180/422 |
| 4,519,275 | A | | 5/1985 | Maruyama et al. |
| 4,572,310 | A | | 2/1986 | Peter |
| 4,620,575 | A | | 11/1986 | Cuba et al. |
| 4,682,515 | A | | 7/1987 | Reed |
| 4,695,068 | A | * | 9/1987 | Kawamoto et al. ......... 180/409 |
| 4,706,976 | A | * | 11/1987 | Kawamoto et al. ......... 180/409 |
| 4,753,310 | A | * | 6/1988 | Hashimoto .................. 180/446 |
| 4,787,645 | A | * | 11/1988 | Ohbayashi et al. ......... 180/445 |
| 4,790,399 | A | | 12/1988 | Middlesworth |
| 4,799,401 | A | | 1/1989 | Reed |
| 4,817,460 | A | | 4/1989 | Reed |
| 4,828,063 | A | * | 5/1989 | Ogura et al. ................ 180/400 |
| 4,869,333 | A | * | 9/1989 | Morishita et al. ........... 180/404 |
| 4,939,436 | A | * | 7/1990 | Morishita et al. ........... 318/434 |

(Continued)

*Primary Examiner*—Hau Phan
(74) *Attorney, Agent, or Firm*—King & Schickli, PLLC

(57) ABSTRACT

A control system with slow-in-turn capabilities for use with a self-propelled, steerable vehicle, such as a lawn mower, is disclosed. In one embodiment, the system slows the vehicle speed when turns are made beyond a predetermined range and the speed is at or above a predetermined level, as determined by a speed control device operatively connected to the speed control structure of a motive device by a speed control linkage. This slowing results in increased traction for achieving tighter turns and also improves dynamic stability. Two different types of rack-and-pinion steering systems capable of being used with the control system are also disclosed.

19 Claims, 15 Drawing Sheets

U.S. PATENT DOCUMENTS

| | | |
|---|---|---|
| 4,941,863 A | 7/1990 | Sampei et al. |
| 4,953,649 A * | 9/1990 | Kawai et al. ............... 180/412 |
| 4,997,412 A | 3/1991 | Reed |
| 5,020,308 A | 6/1991 | Braun et al. |
| 5,030,177 A | 7/1991 | Reed |
| 5,048,633 A * | 9/1991 | Takehara et al. ............ 180/197 |
| 5,076,377 A | 12/1991 | Frazer |
| 5,078,225 A * | 1/1992 | Ohmura et al. ............. 180/446 |
| 5,080,209 A | 1/1992 | Yurko |
| RE34,057 E | 9/1992 | Middlesworth |
| 5,420,793 A * | 5/1995 | Oo et al. ...................... 701/93 |
| 5,529,135 A | 6/1996 | Wenzel et al. |
| 5,598,335 A * | 1/1997 | You ............................ 701/65 |
| 5,644,903 A | 7/1997 | Davis, Jr. |
| 5,649,606 A | 7/1997 | Bebernes et al. |
| 5,848,520 A | 12/1998 | Arfstrom et al. |
| 5,887,671 A | 3/1999 | Yuki et al. |
| 5,897,450 A | 4/1999 | May |
| 6,092,617 A | 7/2000 | White, III et al. |
| 6,129,164 A | 10/2000 | Teal et al. |
| 6,131,689 A | 10/2000 | Nodorft et al. |
| 6,167,341 A * | 12/2000 | Gourmelen et al. .......... 701/95 |
| 6,185,920 B1 * | 2/2001 | Oxley ........................ 56/14.7 |
| 6,196,342 B1 | 3/2001 | Teal et al. |
| 6,257,357 B1 | 7/2001 | Teal et al. |
| 6,361,457 B1 | 3/2002 | May et al. |
| 6,491,122 B1 * | 12/2002 | Leitner et al. ............. 180/65.8 |
| 6,687,589 B1 * | 2/2004 | Kanda ......................... 701/41 |

* cited by examiner

VEHICLE CONTROL SYSTEM WITH SLOW-IN-TURN CAPABILITIES AND RELATED METHOD

This application claims the benefit of U.S. Provisional Patent Application Ser. No. 60/359,387, filed Feb. 25, 2002, U.S. Provisional Patent Application Ser. No. 60/390,266, filed Jun. 20, 2002, and U.S. Provisional Patent Application Ser. No. 60/398,155, filed Jul. 24, 2002, the disclosures of which are incorporated herein by reference.

TECHNICAL FIELD

The present invention relates generally to vehicles and, more particularly, to providing a self-propelled, steerable vehicle with slow-in-turn capabilities.

BACKGROUND OF THE INVENTION

Vehicles in the form of riding mowers and tractors having a traditional mechanical steering system with a steering wheel controlled by a seated operator are in widespread use. While this type of steering system generally provides an acceptable level of steer wheel traction and dynamic stability during regular turning at low speeds, problems occur during relatively sharp turns if the vehicle speed is relatively high and left unchecked. This is especially true in vehicles equipped with modern, Ackerman-type steering systems that allow the steerable wheels to pivot different amounts up to almost 90° in either direction (180° total) to achieve particularly tight turns.

For example, in the case of a self-propelled lawn mower, it is difficult if not impossible at high speeds to make the tight turn necessary to mow around a small round or circular object, such as a pole or shrub, without the operator actively reducing the vehicle speed. Even at moderate speeds, a sudden, sharp turn may also result in a lifting of the wheels from the ground and a concomitant loss of traction. This is deleterious, in that it allows the vehicle to essentially slide out of the turn and effectively miss the intended path of travel, which can not only be frustrating, but may also damage the turf. The lifting of the wheels also reduces dynamic stability and, hence, poses safety concerns. These concerns led the American National Standards Institute (ANSI) to promulgate standards regarding the maximum amount of wheel lift permitted during a turn for self-propelled, rider-operated lawn mowers. To meet the standards, it is thus desirable to automatically reduce the speed of the vehicle as a turn is made in an effort to reduce the amount of wheel lift or eliminate it altogether.

In the past, others have proposed control systems that automatically slow a vehicle during turns in an effort to address and overcome the foregoing problems. One such system is disclosed in Toro's U.S. Pat. No. 6,092,617 to White, III. et al., the disclosure of which is incorporated herein by reference. While this "slow-in-turn" system may achieve the desired result, it is terribly complicated in design and, thus, expensive to manufacture, install, and maintain. The part of the system providing the slow-in-turn capabilities is also not well-suited for retrofitting on most existing vehicles, since it primarily applies to a specialized type of drive system. The particular embodiments of the system disclosed in this patent also slow the speed of the vehicle regardless of the degree of turning. However, for a certain range of turns, a reduction in vehicle speed is simply not required to maintain traction and achieve dynamic stability.

Another vehicle control system with slow in turn characteristics is described in U.S. Pat. No. 4,572,310 to Peter, which is also incorporated herein by reference. However, it basically applies to machines with drive wheels controlled by individual clutches. Consequently, it is not well-suited for application to the current designs of the majority of lawn mowers, tractors, and similar vehicles that do not have such clutches.

A vehicle having extremely tight turning characteristics is described in my U.S. Pat. No. 6,185,920, which is also incorporated herein by reference. In view of the tight turning radius that can be achieved by this vehicle, it can especially benefit from the steer traction and dynamic stability enhancement provided by a slow-in-turn system. This patent proposes accomplishing the enhancement by providing individual left and right brakes for the drive wheels. Moreover, the speed of the individual driven wheels can be manually controlled to slow the vehicle down during a turn to improve both tracking and traction. While these arrangements thus provide beneficial slow-in-turn capabilities, both require active or independent manual input from the operator.

Accordingly, a need is identified for an improved vehicle control system with slow-in-turn capabilities. The system would automatically slow the vehicle during turns made beyond or outside a predetermined range, and especially during the sharpest of turns. The automatic nature of the system means that independent manual input by the operator would be unnecessary to make the speed adjustment. The system would also be simple and robust in both design and operation, thus keeping the manufacturing, installation, and maintenance expense at a minimum, yet without sacrificing functionality. This simplicity would also allow the system to be easily adapted for use with or retrofitted onto many types of existing self-propelled, rider-operated vehicles, such as riding lawn mowers, without significant cost or effort.

SUMMARY OF THE INVENTION

In accordance with a first aspect of the invention, a system for intended use in temporarily reducing the speed of a vehicle including a motive device for driving the vehicle at a speed corresponding to a speed control structure and a steerable ground-engaging structure for controlling a direction of vehicle travel is disclosed. The system comprises a steering device for steering the ground-engaging structure and a connector operatively connecting the steering device with the speed control structure. The connector includes a flexible part assuming a first, non-activated condition when the steering device is actuated within a predetermined range such that the speed control structure is substantially unaffected and assuming a second, activated condition when the steering device is actuated beyond the predetermined range such that the speed control structure is automatically actuated to reduce the speed.

In one embodiment, the steering device includes a steering wheel connected to a shaft carrying a pinion adapted for engaging a rack operatively connected to a first end of the flexible part. The rack is mounted to the vehicle so as to move to and fro corresponding to the movement of the steering wheel, including through the predetermined range. A bearing is also provided for engaging the flexible part in both the first and second conditions. A means is provided for supplying a force for holding the flexible part substantially taut and in engagement with the bearing when in the first condition. The holding force is overcome when the flexible part assumes the second condition. The holding means may comprise a spring extending between the flexible part and a stable support structure associated with the vehicle.

An operator-actuated speed control device is operatively connected to a speed control linkage forming part of the connector. The speed control linkage, in turn, is operatively connected to the speed control structure of the motive device at one end, and to a second end of the flexible part at the other. Preferably, the positioning of these structures is such that the flexible part is capable of assuming the second, activated condition only when the speed control device is actuated at least a predetermined extent. The flexible part is preferably an elongated chain, and the predetermined range is preferably about 75% to the right of a position of the steering device for straight ahead travel and about 75% to the left of the straight ahead travel position.

In accordance with a second aspect of the invention, a vehicle is provided. The vehicle comprises a steerable, ground-engaging structure for controlling a direction of vehicle travel, a motive device for driving the vehicle at a speed corresponding to a speed control structure, a movable steering device for steering the ground-engaging structure, and a system for temporarily reducing the speed of the vehicle. The system includes a connector operatively connecting the steering device with the speed control structure. The connector includes a flexible part assuming a first, non-activated condition when the steering device is actuated within a predetermined range such that the speed control structure is substantially unaffected and assuming a second, activated condition when the steering device is actuated beyond the predetermined range such that the speed control structure is automatically actuated to reduce the speed.

In accordance with a third aspect of the invention, a speed control system for a vehicle including a motive device for driving the vehicle at a speed corresponding to a speed control structure and a steerable ground-engaging structure for controlling a direction of vehicle travel is provided. The speed control system comprises operator-actuated means for steering the ground-engaging structure, including within the predetermined range and means for temporarily reducing the speed of the vehicle by actuating the speed control structure to reduce the speed when the steering means is actuated beyond the predetermined range.

In one embodiment, the steering means comprises a steering wheel connected to a shaft carrying a pinion adapted for engaging a rack mounted to the vehicle so as to move to and fro corresponding to the actuation or movement of the steering wheel through the predetermined range, wherein the rack is operatively connected to the ground-engaging structure. The speed reducing means may comprise a connector operatively connecting the steering means with the speed control structure. The connector includes a flexible part assuming a first, non-activated condition when the steering means is actuated within a predetermined range such that the speed control structure is substantially unaffected and assuming a second, activated condition when the steering means is actuated beyond the predetermined range such that the speed control structure is automatically actuated to reduce the speed.

In another embodiment, a sensor is provided for detecting whether the steering means is within the predetermined range. In this embodiment, the speed reducing means comprises an actuator operatively connected to the sensor and the speed control structure, the actuator assuming a first, non-activated condition when the steering device is actuated within a predetermined range such that the speed control structure is substantially unaffected and assuming a second, activated condition when the steering device is actuated beyond the predetermined range such that the speed control structure is automatically actuated to reduce the speed.

In accordance with a fourth aspect of the invention, a method for temporarily reducing the speed of a vehicle having a steerable ground-engaging structure for controlling a direction of vehicle travel is disclosed. The method comprises driving the vehicle at an operator-selected speed, steering the ground-engaging structure, including within a predetermined range, and automatically slowing the vehicle only when the operator-selected speed is above a predetermined level and the steering exceeds the predetermined range.

The slowing step may include providing a flexible part between a speed control linkage associated with a motive device for performing the driving step and a steering device for performing the steering step. The flexible part is in a non-activated condition when the vehicle is driven at or below the operator-selected speed. However, upon exceeding the predetermined range of steering when the operator-selected speed is above the predetermined level, the flexible part assumes an activated condition and automatically reduces the speed to slow the vehicle.

In accordance with a fifth aspect of the invention, a rack-and-pinion type steering system for a vehicle having at least one steerable ground-engaging structure controlled using a steering device is disclosed. The system comprises a first rack operatively connected to the steering device and adapted for moving to and fro in a first direction, a rotatably mounted first pinion operatively connected to the first rack, and a second rack operatively connected to the first pinion and adapted for moving to and fro in a second direction generally transverse to the first direction. The second rack is operatively connected to the ground-engaging structure such that the movement of the first rack in the first direction rotates the pinion, which in turn moves the second rack in the second direction to steer the ground-engaging structure.

In one embodiment, the steering device includes a steering wheel connected to a shaft carrying a second pinion adapted for engaging a third, pivotally mounted rack connected to a first end of the first rack. The pivoting movement of the third rack created by the rotation of the steering wheel and shaft together causes the first rack to move to and fro in the first direction. The first and second racks may be held in engagement with the first pinion by bearings and, most preferably, roller bearings.

The steering system may also be adapted for use on a vehicle including a motive device for driving the vehicle at a speed corresponding to a speed control structure and a system for temporarily reducing the speed of the vehicle, the system including a connector operatively connecting the first rack with the speed control structure. The connector includes a flexible part assuming a first, non-activated condition when the steering device is actuated within a predetermined range such that the speed control structure is substantially unaffected and assuming a second, activated condition when the steering device is actuated beyond the predetermined range such that the speed control structure is automatically actuated to reduce the speed.

In accordance with a sixth aspect of the invention, a rack-and-pinion type steering system for a vehicle having at least one steerable ground-engaging structure controlled using a steering device is disclosed. The system comprises a first rack operatively connected to the steering device and adapted for moving to and fro in a first direction in a first plane; a first pinion operatively connected to the first rack; a rotatably mounted spindle operatively connected to the first pinion; a second pinion operatively connected to the spindle; a second rack operatively connected to the first pinion and adapted for moving to and fro in a second direction generally transverse to the first direction in a second plane, the second rack being operatively connected to the ground-engaging structure. The movement of the first rack in the first direction rotates the first pinion, which rotates the second pinion and causes the second rack to move in the second direction to change the orientation of, or steer, the ground-engaging structure.

In one embodiment, the steering device includes a steering wheel connected to a shaft carrying a third pinion adapted for engaging a first end of the first rack, whereby the movement of the third pinion created by the rotation of the steering wheel and shaft causes the first rack to move to and fro in the first direction. In this embodiment, the first rack is held in engagement with the first pinion by a roller bearing, and the second rack is a bar held in engagement with the second pinion by a pair of brackets. The brackets may include bushings for slidably engaging and allowing the bar to move to and fro in the second direction. The first and second planes in which the first and second racks move may also be generally horizontal.

The system may also be adapted for use on a vehicle comprising a motive device for driving the vehicle at a speed corresponding to a speed control structure and a system for temporarily reducing the speed of the vehicle. The system includes a connector operatively connecting the first rack with the speed control structure. The connector includes a flexible part assuming a first, non-activated condition when the steering device is actuated within a predetermined range such that the speed control structure is substantially unaffected and assuming a second, activated condition when the steering device is actuated beyond the predetermined range such that the speed control structure is automatically actuated to reduce the speed.

BRIEF DESCRIPTION OF THE DRAWINGS

The accompanying drawings incorporated in and forming a part of the specification illustrate several aspects of the present invention and, together with the description, serve to explain the principles of the invention.

In the drawings.

DETAILED DESCRIPTION OF THE PREFERRED EMBODIMENT

Figure 1:
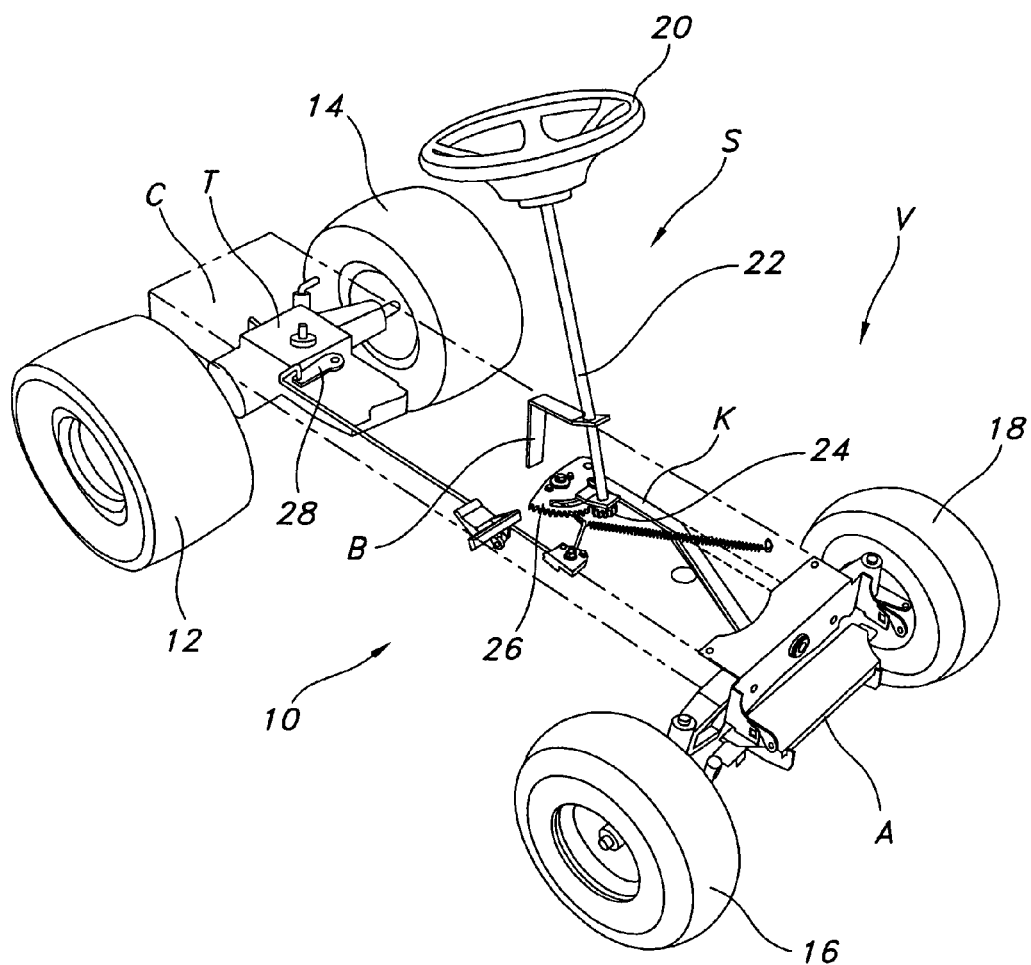
FIG. 1 is an overall perspective view of a wheeled, self-propelled vehicle chassis including the control system with slow-in-turn capabilities forming one aspect of the invention.

Reference is now made to FIG. 1 of the drawings, which depicts a vehicle V including the control system 10 with slow-in-turn capabilities forming one aspect of the present invention. The vehicle V is of the self-propelled type and, hence, includes a motive device for driving at least one ground-engaging structure, such as a wheel. In the illustrated embodiment, the motive device comprises an onboard transmission T for driving a pair of wheels 12, 14 mounted at the rear end of the frame forming part of the chassis C of the vehicle V at a selected speed and in a selected direction. The transmission T may be of the hydrostatic variety having three distinct operating modes (forward, reverse, and neutral) with variable speed control in at least the mode corresponding to forward travel. Alternatively, as discussed further below, the transmission may be of the belt-driven mechanical variety, including one with a forward drive mode having a plurality of different speeds (e.g., a five speed transmission) and a reverse drive mode, or one with three distinct operating modes (forward, neutral, and reverse). In any case, an onboard motor (internal combustion, electric, etc.; not shown) may be used to provide power to the transmission T for driving the vehicle wheels 12, 14.

Figure 2:
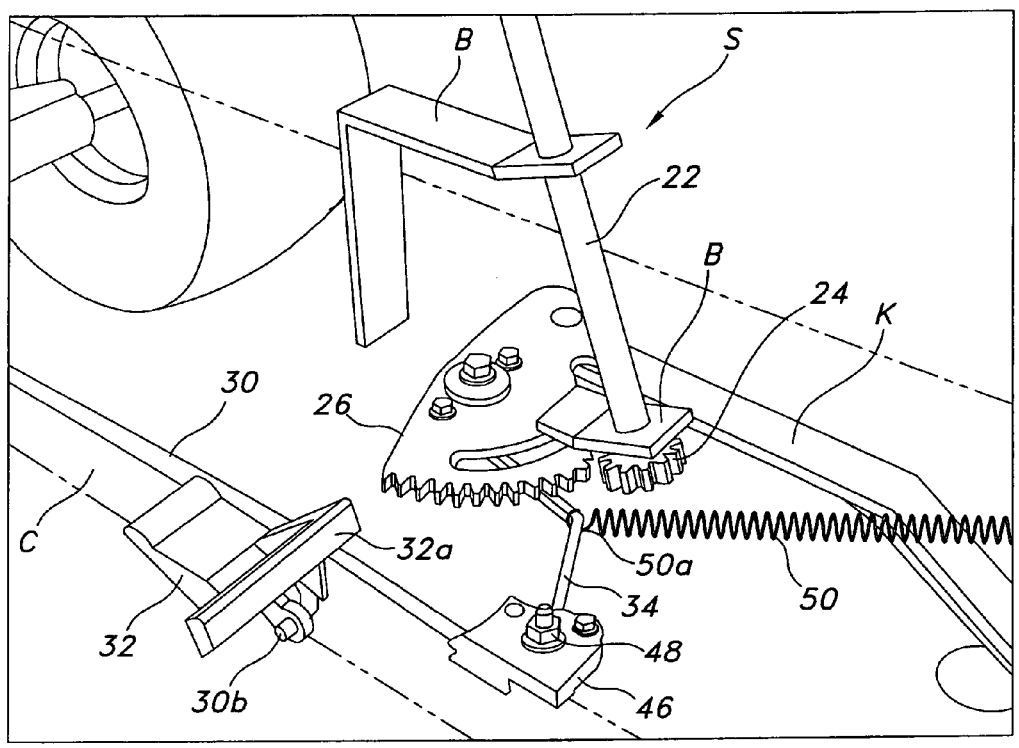
FIG. 2 is an enlarged, partially cutaway perspective view of part of the vehicle chassis of FIG. 1.
Figure 3:
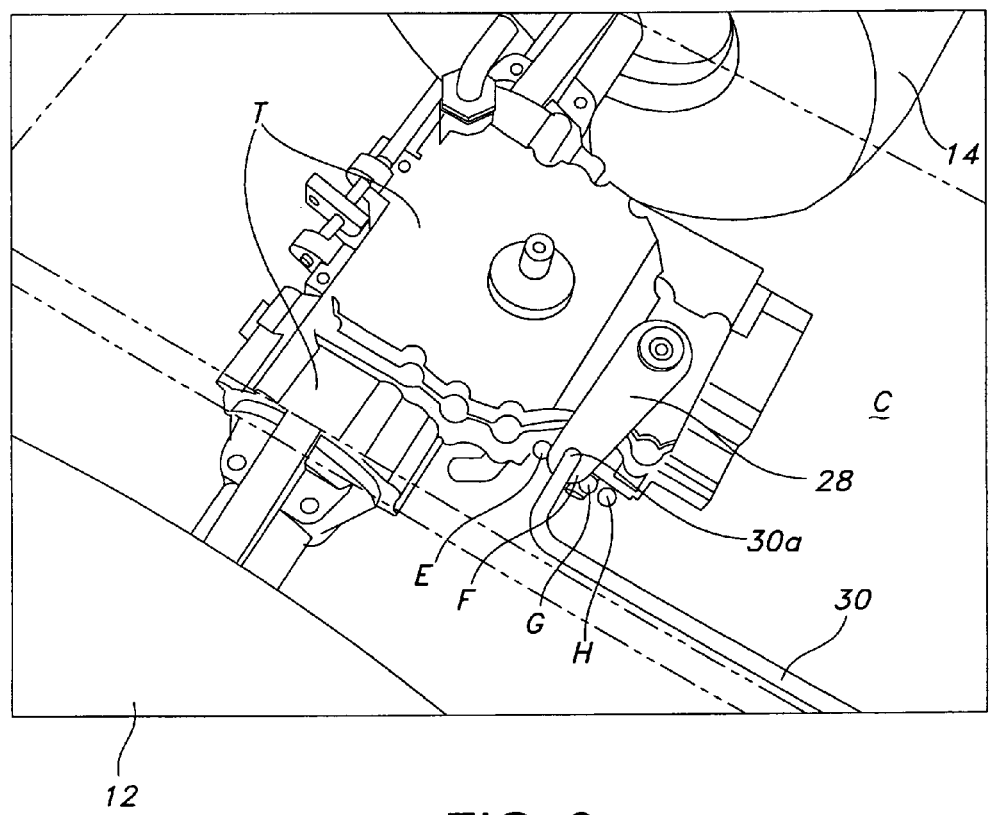
FIG. 3 is an enlarged, partially cutaway perspective view of the hydrostatic transmission carried by the vehicle chassis of FIG. 1.

The vehicle V is steerable by an onboard operator (not shown) and, hence, includes at least one steerable, ground-engaging structure for controlling the direction of vehicle travel. In the illustrated embodiment, the direction of travel is controlled by a pair of non-driven wheels 16, 18 capable of being turned in tandem by the operator using a steering system S. An exemplary steering system S comprises an operator-actuated steering means or device, such as a steering wheel 20, supported by a rotatably mounted shaft 22 (note support brackets or bushings B in FIG. 2) carrying a pinion 24 for engaging a toothed, semi-circular gear plate or rack 26 pivotally mounted to the frame or chassis C of the vehicle V. The rack 26 forming part of the steering system S is, in turn, connected to a steering control assembly A for simultaneously turning the wheels 16, 18 by a linkage or rack K (see FIGS. 2 and 3, as well as FIG. 10). Hence, by actuating (moving or rotating) the steering wheel 20 in either direction, the shaft 22 and pinion 24 rotate together. Consequently, the rack 26 is pivoted or moved through a range of motion, which causes the corresponding linkage or rack K to move to and fro and control the steering assembly A for turning the front wheels 16, 18 of the vehicle in a corresponding direction (which, of course, depends upon the particular arrangement of structures, such as gears, used; see FIG. 10). The steering control assembly A may be of the Ackerman-type, which as is well-known in the art is adapted for turning the inside wheel to a greater degree than the outside wheel to achieve a true path or synchronized turn in either direction. However, it will be appreciated by the skilled artisan that the above-described arrangement represents only one of many possible types of steering systems or devices that may be used to control the direction of travel of a vehicle. As discussed in more detail below, other types of steering arrangements or systems may also be used with the control system 10 forming one aspect of the present invention (see, e.g., U.S. Pat. No. 5,529,135 to Wenzel et al, the disclosure of which is incorporated herein by reference).

The transmission T for rotating the wheels 12, 14 is typically provided with a speed control structure in the form of a lever 28 (but as described further below, in the case of a mechanical transmission, the speed control structure may comprise one or more operator-actuated, variable speed pulleys). As perhaps best shown in FIG. 3, the speed control lever 28 on a hydrostatic transmission T of the type shown is usually capable of moving through a range of motion that controls not only the magnitude of the speed at which the driven wheels 12, 14 are rotated, but also the direction of rotation (i.e., forward or reverse). In the exemplary embodiment shown, the maximum position of the speed control lever 28 toward the rear end of the vehicle V represents the maximum forward speed of travel, as indicated by a dark circle identified by reference character E. The circle identified by reference character G represents the position of the speed control lever 28 where the transmission is in neutral and is, thus, not driving the wheels 12, 14. Between positions E and G, the forward speed is proportionately controlled based on the position of the speed control lever 28. Position F may be representative of an intermediate or slower forward speed (e.g., about 50% of the maximum amount) for achieving turns beyond a certain range without losing traction or dynamic stability. The forwardmost position of the speed control lever 28, represented by the circle labeled H, causes the transmission T to drive the wheels 12, 14 in reverse.

A connector couples or connects the speed control lever 28 to an operator-actuated speed control device used for controlling the speed of the vehicle V. In particular, and with collective reference to FIGS. 2, 3, and 4, the speed control lever 28 is connected to the first end 30a of an speed control linkage 30 forming part of the connector. The second or opposite end 30b of the speed control linkage 30 is connected to the speed control device, which may be in the form of a pivotally mounted foot pedal 32 supported by a post P extending from the frame or chassis C of the vehicle V. Instead of a pedal 32, the speed control device could also be a hand-controlled structure, such as a lever (not shown). In either case, the arrangement is such that when the speed control device is at a home position, the speed control linkage 30 maintains the speed control lever 28 at the neutral position, as represented by reference character G in FIG. 3.

In the case of a pivoting foot pedal 32, means such as a spring (not shown) may be used to bias it toward the home position, which maintains the transmission T in the neutral mode of operation when the pedal is not actuated. When the pedal 32 is moved or pivoted forward from the home position about the pivot axis defined by the post P, such as if the operator engages a first, transversely extending tread 32a (FIGS. 3 and 4) with the ball or toes of the corresponding foot, the biasing force is overcome and the speed control linkage 30 moves rearwardly an amount corresponding to the degree to which the pedal 32 is moved or pivoted. A corresponding adjustment is thus made to the speed control lever 28 to cause the transmission T to rotate the driven wheels 12, 14 forward at a selected speed corresponding to the position of the lever. Hence, by selectively adjusting the amount of pivoting of the pedal 32, the forward speed at which the vehicle V travels may by controlled.

Likewise, by moving or pivoting the pedal 32 rearwardly from the home position about the axis defined by the post P, such as by the operator using his or her heel to engage a second, transversely extending tread 32b, the speed control lever 28 is moved to the reverse position (reference character H in FIG. 3) to move the vehicle V in the reverse direction. Typically, the range of motion of the speed control lever 28 possible on the reverse side is much smaller than that on the forward side, since it is usually unnecessary to drive a vehicle V such as a lawn mower or tractor in reverse at either a high rate of speed or at several different speeds during normal operation.

Figure 6:
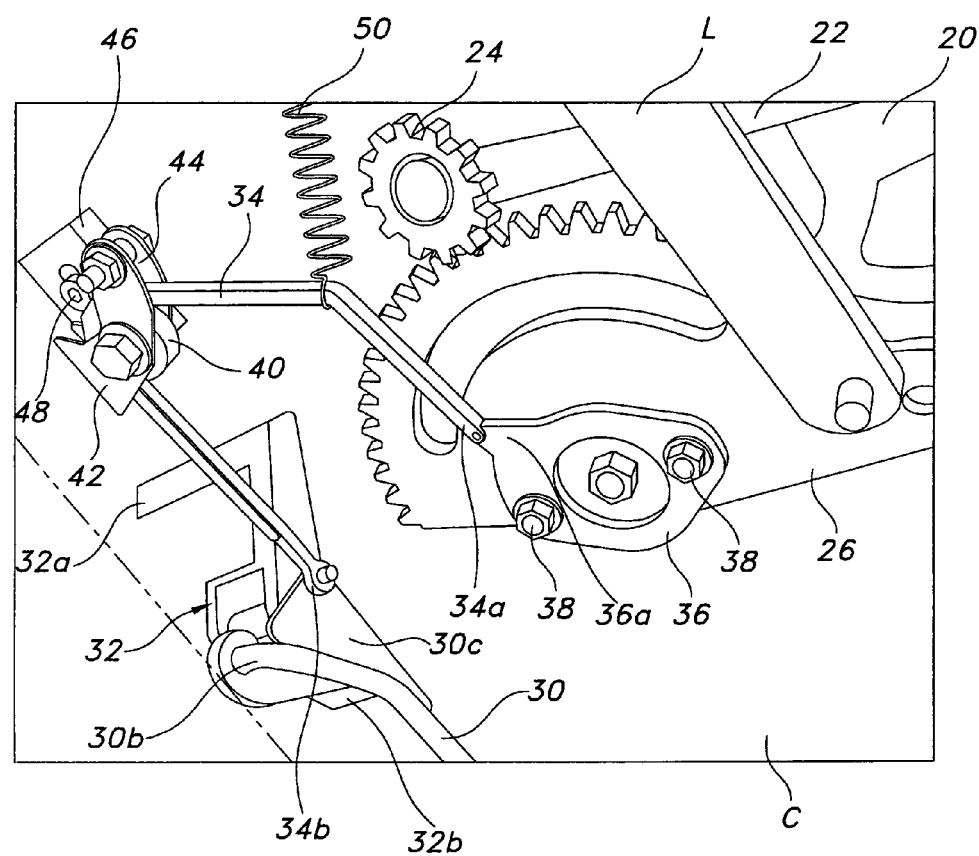
FIG. 6 is an enlarged, partially cutaway perspective view showing the control system with slow-in-turn capabilities forming one aspect of the invention.

In accordance with a first aspect of the invention, the connector also includes a flexible part operatively connecting the steering system S and, in particular, the rack 26, to the speed control linkage 30. With reference in particular to FIG. 6, the flexible part of the connector is preferably in the form of an elongated, non-elastic, non-compressible, side-flexing chain 34 capable of assuming either a first, non-activated condition and a second, activated condition. A first end 34a of the chain 34 is connected to an anchor 36 secured to the rack via fasteners 38 and, hence, capable of rotating therewith. The connection is made at a predetermined point on the anchor 36, such as a projecting finger 36a, for reasons outlined further in the description that follows. The second, opposite end 34b of the chain 34 is shown as being connected directly to an extension 30c of the speed control linkage 30. However, as will be understood upon reviewing the description that follows, it is possible to connect this second end of the chain 34b directly to the pedal 32 as well, or to any other type of speed control device used (e.g., a hand lever). The connection between the ends 34a, 34b of the chain 34 and the anchor 36 and extension 30c may be established using conventional removable fasteners or any other secure means of permanent or semi-permanent attachment.

Figure 5:
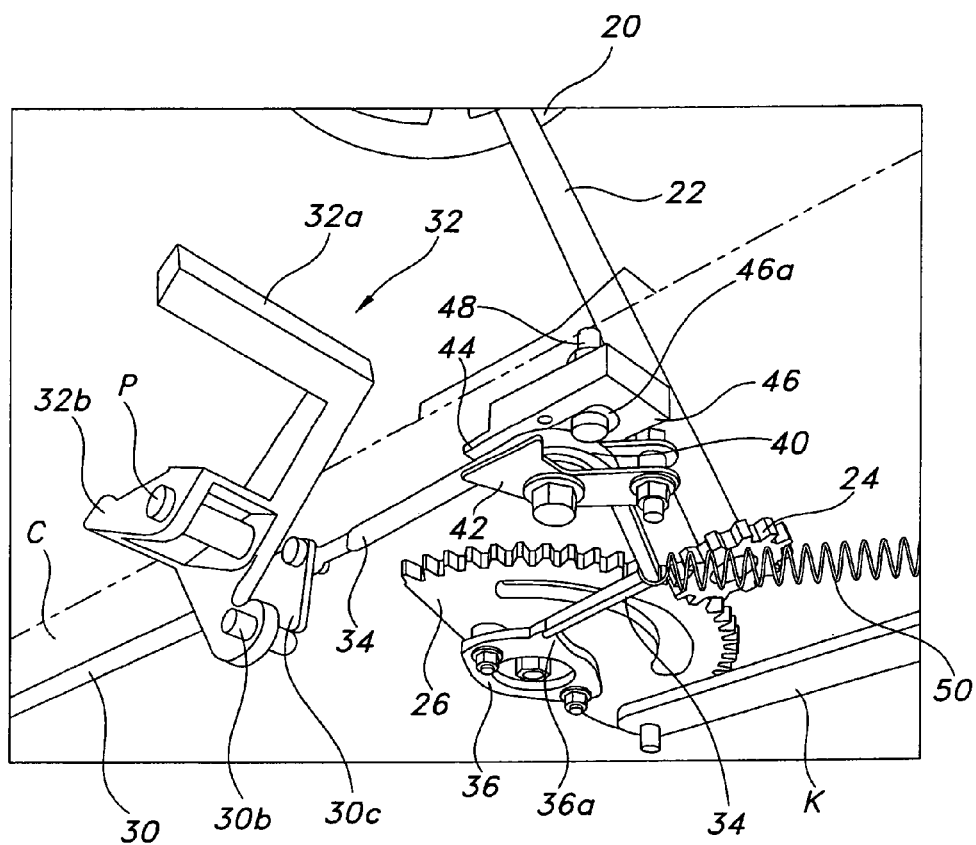
FIG. 5 is an enlarged, partially cutaway perspective view similar to FIG. 4.

A bearing 40 is provided for engaging a portion of the chain 34 extending from the anchor 36 to the speed control linkage 30. The bearing 40 is supported from the vehicle frame or chassis C and may be positioned between a pair of spaced plates 42, 44. When the chain 34 is routed over the bearing 40, the plates 42, 44 thus serve as guides that capture and generally hold it in position. In a preferred embodiment, and as perhaps best shown in FIG. 5, the subassembly formed of both the bearing 40 and plates 42, 44 may be supported by an adjustment block 46 connected to the chassis C by a fastener 48, such as a bolt and a nut. The adjustment block 46 includes an elongated slot 46a though which the fastener passes 48. By changing the position of the adjustment block 46 relative to the frame or chassis C, adjustments may be made to the position to the bearing 40, such as may be necessary to address any tolerance or wear issues and insure that the chain 34 reaches the activated position as desired.

As will be better understood from the description that follows, the length of the chain 34 in this preferred embodiment is such that, when in a "non-activated" condition, slack results when the steering wheel 20 is turned and the rack 26 moves or pivots within a certain predetermined range. This includes the position of the steering wheel 20 and rack 26 corresponding to straight-ahead travel when, of course, no automatic slowing of the vehicle speed is desired or necessary to maintain traction or dynamic stability. Moreover, when the steering wheel 20 is rotated in either direction within a predetermined range (e.g., 75% to the left or right of center) and the speed control device (foot pedal 32) is actuated (pivoted) to any extent, the chain 34 remains in a slackened or non-activated state. In other words, based on the length of the chain 34 and the preselected attachment location on the anchor 36, the slack is never fully removed to a sufficient degree to cause the chain to tighten over the bearing 40 and move the speed control linkage 30 from a position set by the operator using the speed control device, or foot pedal 32. This is desirable, since even when the vehicle is traveling at the maximum speed, the steering wheel 20 may be rotated within some predetermined range without causing the wheels to lose traction or creating dynamic instability.

Likewise, when the speed control device or foot pedal 32 is pivoted to less than a certain extent such that the speed control linkage 30 maintains the speed control lever 28 at or below a certain selected speed (which is represented by position F in FIG. 3), the chain 34 remains slackened and hence, non-activated, regardless of the degree to which the steering wheel 20 is rotated to turn or steer the steerable wheels 16, 18. This is because, even when the anchor 36 is pivoted to the maximum extent in either direction as the result of the turning of the steering wheel 20, the speed control linkage 30 is not moved rearwardly a sufficient distance to allow the chain 34 to tighten. This mode of operation is also acceptable and desirable, since when the speed is at or below a certain level, the slow-in-turn adjustment is not necessary to maintain wheel traction and achieve dynamic stability, regardless of the degree of turning.

Figure 7:
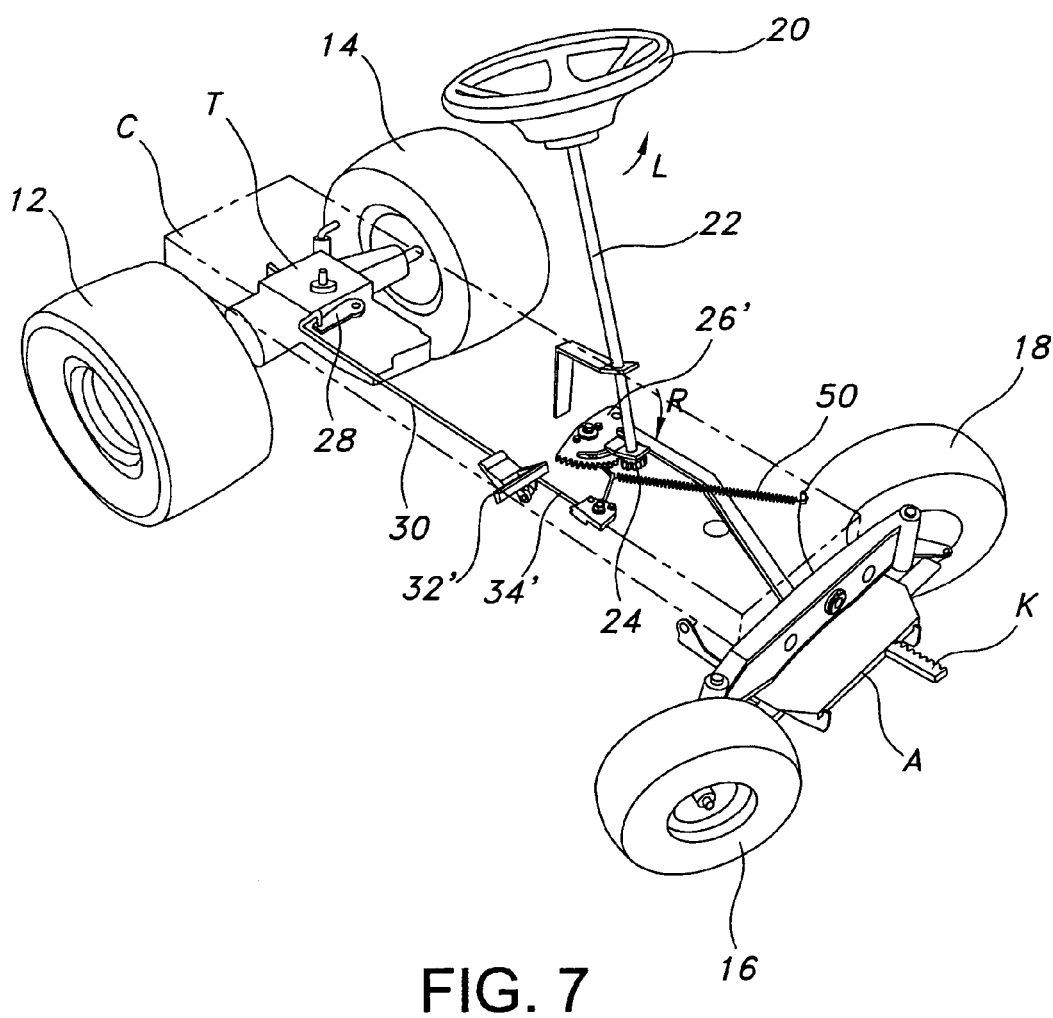
FIG. 7 is a perspective view of the vehicle chassis of FIG. 1, with the steering device actuated such that the vehicle is making a sharp turn in one direction.
Figure 8:
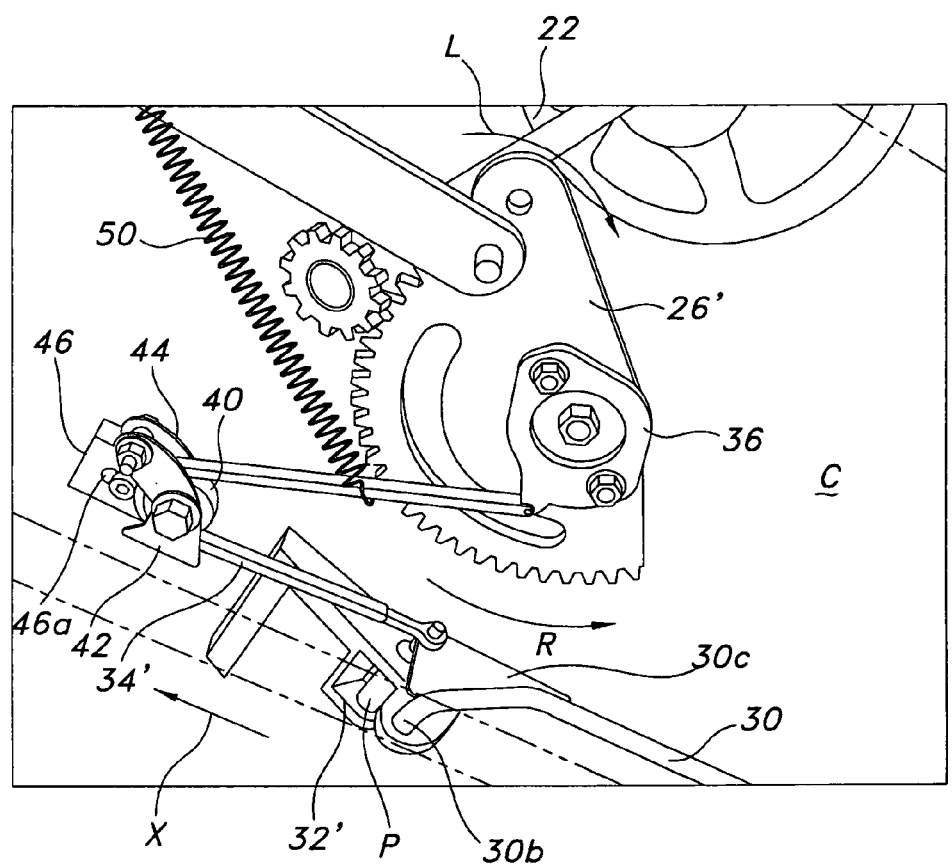
FIG. 8 is an enlarged, partially cutaway perspective view showing the control system on the vehicle chassis depicted in FIG. 7.

However, when the speed control device (foot pedal 32) is set such that the speed control linkage 30 is moved rearwardly to a certain extent and the steering wheel 20 is rotated in either direction beyond the predetermined range (see FIGS. 7–8 and note maximum left hand turn position of rack 26' (action arrow L denoting the direction in which steering wheel 20 is turned and arrow R denoting the direction in which the rack 26 turns) and fully pivoted position of pedal 32'), the chain 34' assumes a fully tightened or activated condition. In this condition, the chain 34' moves or pulls the speed control linkage 30 in the direction of action arrow X in FIG. 8. This, in turn, moves the speed control lever 28 from a selected position toward the position shown in FIG. 3 as corresponding to reference numeral F (which may be 50% of the maximum forward speed) and also urges the foot pedal 32 toward the home position to a slight degree, essentially overriding the operator input. The movement of the speed control lever 28 from the selected position thus automatically slows the vehicle speed as the sharp turn is made (note the orientation of the steerable wheels 16, 18 in FIG. 7) without necessitating independent operator action or input. Consequently, dynamic stability and traction are maintained.

Aside from the obvious slowing of the vehicle, the only thing out of the ordinary that might be noticed by the operator is a slight urging of the speed control device, such as foot pedal 32, toward the home or neutral position. This, of course, is the result of the chain 34 in the activated or tightened condition moving the speed control linkage 30 (which is connected to the speed control device or pedal 32) to effect a reduction in the vehicle speed. However, even if the operator tries to further actuate the speed control device or foot pedal 32 of this embodiment in response to sensing this urging force, nothing of significance in terms of speed should happen as long as the steering wheel 20 remains actuated or turned beyond the predetermined range. This is because the non-elastic chain 34 used in this embodiment is fully tightened in the actuated condition and is pulling the speed control linkage 30 forward. In other words, moving the speed control linkage 30 rearwardly using the foot pedal 32 requires that either the chain 34 give or stretch (which cannot happen under the forces typically present) or the steering wheel 20 and, hence, rack 26, move back within the predetermined range where slack would be introduced in the chain to allow it to assume the non-activated condition.

As the steering wheel 20 is then actuated or moved towards the straight-ahead travel position and re-enters the predetermined range, the chain 34 becomes slackened and returns to the non-activated condition. As this occurs, the override is lost and control over the speed is gradually returned to the operator via speed control device or foot pedal 32. In the typical case, the operator continues to push down on the foot pedal 32 as the turn is negotiated, such that when the steering wheel 20 is actuated or moved back within the predetermined range, the pedal is gradually pivoted forward. As a result, the speed control linkage 30 automatically returns the speed control lever 28 to the corresponding position for forward travel at the selected speed. Since the part of the turn that might have otherwise created the loss of traction and instability has already been made, continuing forward travel at or near the maximum speed presents no problems in this regard.

It is also possible that the operator could "let up" on the speed control device or pedal 32 during the sharp part of the turn corresponding to the turning of the steering wheel 20 beyond the predetermined range or as the vehicle V alights therefrom. In either case, the chain 34 would immediately become slacked and assume the non-activated condition, even before the steering wheel 20 is actuated or moved back within the predetermined range. Hence, as a result of using this type of system 10, the vehicle speed is advantageously slowed when the speed control device is actuated, regardless of the steering wheel 20 position.

Figure 4:
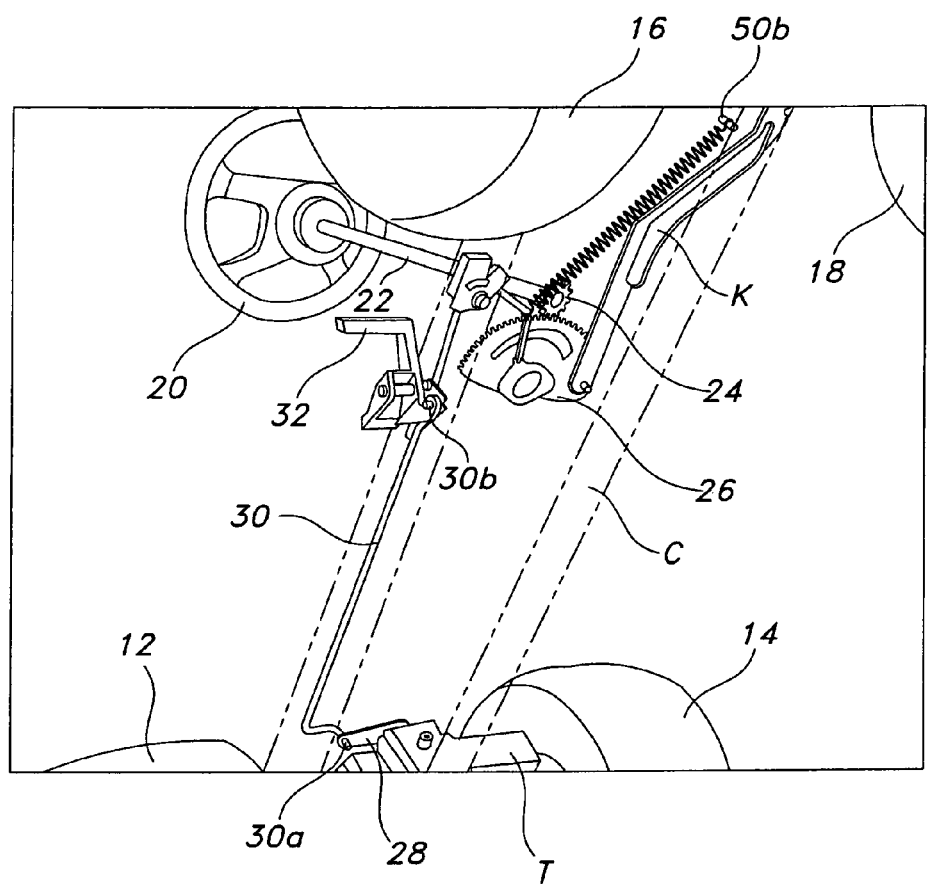
FIG. 4 is a partially cutaway, bottom perspective view of the vehicle chassis of FIG. 1.

The slack in the chain 34 in the operating modes where the slow-in-turn capability is not activated is acceptable and does not affect the manner in which the system 10 operates. Nevertheless, it may be desirable to take up some or all of the slack in this chain 34 without impairing the ability to reach the activated condition and achieve the desired slow-in-turn adjustment. To accomplish this, a means is provided for suppling a sufficient holding force to the chain 34 to take up the slack, yet one that can be overcome when the steering wheel 20 is rotated in either direction beyond the predetermined range. In the illustrated embodiment, this force-supplying means is in the form of a helical tension spring 50 having a first end 50*a* connected to the chain 34 and a second end connected to a stable support structure, such as the vehicle frame F or chassis C (see FIG. 2). As should be appreciated by comparing FIGS. 4 and 7, the spring 50 is extended to a greater degree when the chain 34 is in tightened or in the activated condition (FIG. 7) and to a lesser degree when the chain 34 is slackened or in the non-activated condition (FIG. 4).

Figure 9:
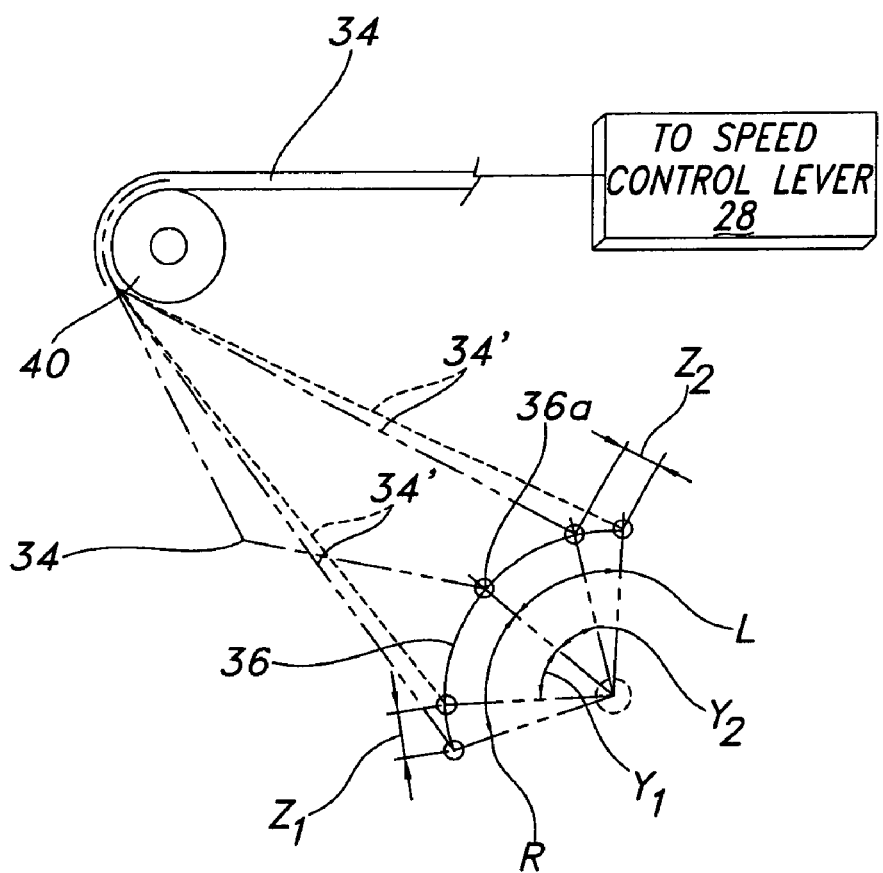
FIG. 9 is a schematic diagram illustrating the various modes of operation of one embodiment of the control system with slow-in-turn capabilities when the steering device is actuated beyond a predetermined range and the vehicle speed is at or above a pre-determined level.

FIG. 9 is a top plan view illustrating schematically the operation of the control system 10 having slow-in-turn capability of the above-described preferred embodiment.

The chain is generally represented by reference numeral 34 and is operatively connected to the speed control lever 28 of the transmission T. The range of movement of the anchor is generally represented by the are labeled 36, and the connection location of the opposite end of the chain 34 is represented by a circle labeled 36a. The diagram also assumes that the speed control device is set to drive the vehicle at or above a certain predetermined speed level where it is determined that the slow-in-turn adjustment is beneficial to improve traction or dynamic stability (usually around 50% of the maximum speed is the desired set point).

As the rack 26 and anchor 36 are together moved, pivoted or rotated within the range represented by the double-headed, generally arcuate action arrows $Y_1$, $Y_2$, the chain 34 remains slackened or in the non-activated condition such that no adjustment to the speed control is made. Action arrow $Y_1$ thus represents the turning of the steering wheel 20 to the right through part of a predetermined range (note arrow R), which as explained above may be about 75% from the center or straight ahead travel position, such that the chain 34 remains slacked and the condition is not activated. As should be appreciated, the rack 26 and the anchor 36 move in the opposite direction of steering wheel 20 to about the same proportional extent as the result of the use of pinion 24. Action arrow $Y_2$ represents the turning of the steering wheel 20 in the other direction, or to the left (note arrow L) which turns the rack 26 and anchor 36 to about the same extent (e.g., 75% from center) in the opposite direction, but without causing the chain 34 to assume the activated condition.

When the steering wheel 20 is turned beyond the predetermined range, which in the illustrated embodiment is about the 75% point in either direction, the continued movement of the rack 26 and, hence, anchor 36, in the corresponding direction causes the chain 34 to tighten and assume the activated condition 34'. As a result of the operative connection between the chain 34 and the speed control lever 28, this tightening or activation thus reduces the speed of the vehicle. The 25% range of movement, or stroke, of the rack 26 in either direction where the slow-in-turn adjustment is made in this preferred embodiment is represented by double-headed action arrows $Z_1$ and $Z_2$.

Figure 9A:
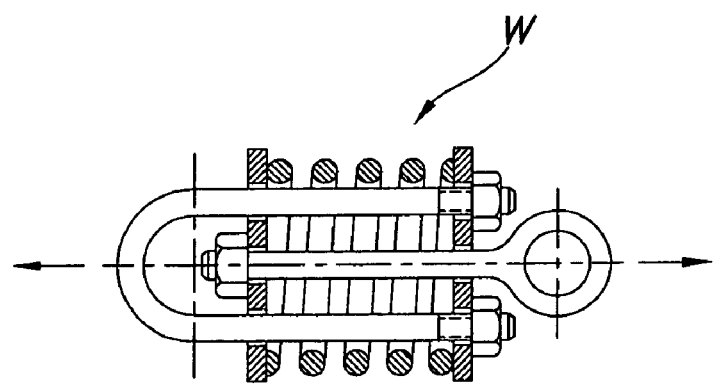
FIG. 9a is a partially cross-sectional, enlarged side view of a spring device that could possibly be used in the control system as part of the connector.

As the foregoing description demonstrates, the selective slow-in-turn speed control of the system 10 of the present invention may be a function of the length and type of flexible part of the connector used, as well as the location at which it is operatively connected to the steering device. As should be appreciated, it is possible to increase the range of actuation by shortening the flexible part of the connector. Likewise, it is possible to decrease the range of actuation by lengthening the flexible part of the connector. Changing the size of the anchor 36 or the point at which the connection is made with the flexible part may also result in an increase or decrease in the range of actuation. Other possibilities include: (1) using an elastic, semi-elastic, or resilient flexible part such that the actuation or movement of the steering device up to a certain degree first lengthens the part to a maximum extent, at which point it reaches the activated condition; (2) connecting an in-line spring or like device (see spring device W in FIG. 9a) to the flexible part such that the actuation or movement of the steering device up to a certain degree actuates the spring and, hence, the part, to a maximum to reach the activated condition; or (3) connecting the flexible part to the steering shaft and providing a sufficient amount of slack such that, for part of a right or left hand turn, the slack is simply taken up as the flexible part wraps around the shaft until the activated condition is reached.

Figure 10:
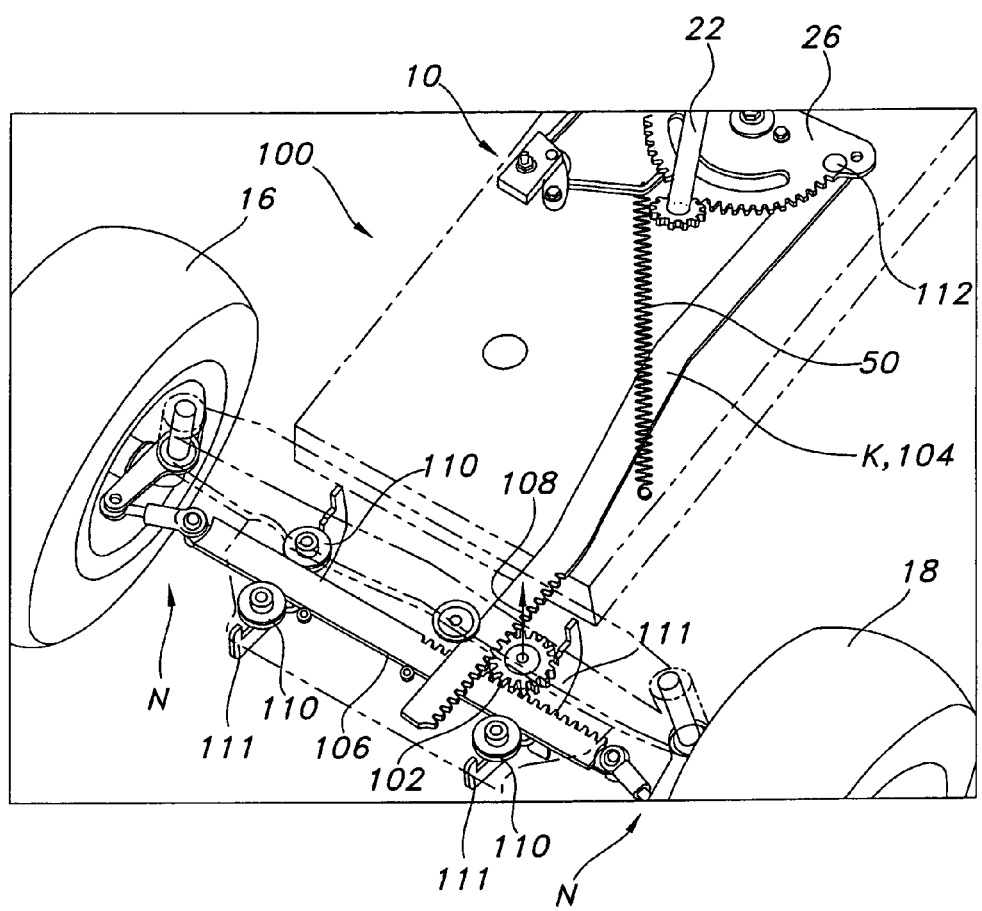
FIG. 10 is a perspective view of a vehicle chassis including a novel steering system that may be used with the control system with slow-in-turn capabilities forming one aspect of the invention.

As briefly mentioned above, use of this control system 10 with other types of steering systems is possible. FIG. 10 shows a novel rack-and-pinion type steering system 100 including a common pinion 102 associated with first and second elongated racks 104 and 106. In this particular example, the single pinion gear 102 rotates about an axis 108 and is mechanically interfaced with both racks 104, 106, which are held or secured in engagement therewith by bearings 110 (preferably rollers) supported by brackets 111. The first rack 104 is operatively connected to a pivoting third rack 26, such as by using a pin 112. As described above, this third rack 26 is mounted such that it is capable of moving or pivoting to and fro in response to the turning of a steering shaft 22 resulting from the turning of a steering wheel (not shown). Hence, as the third rack 26 moves or pivots, the first rack 104 moves to and fro, generally in a first or longitudinal direction, and causes the pinion 102 to rotate. This in turn causes the second rack 106 to move to and fro in a second, transverse or lateral direction for turning or steering the steerable wheels 16, 18. To achieve the maximum benefit of this arrangement, the "knuckles" for connecting the ends of the second rack 106 to the steerable wheels 16, 18 such that each is turned or steered in response to the lateral movement may be of the type disclosed in my U.S. Pat. No. 6,185,920. However, other arrangements may work as well.

Since the number of times that the pinion 102 may rotate is unlimited, this type of system 100 is especially useful to accommodate a wide steer articulation range for extremely tight turning performance. Hence, the use of the control system 10 having slow-in-turn capabilities with this type of steering system 100 may be especially beneficial for the reasons identified in the foregoing discussion. The system 100 also provides a relatively even rate of turning throughout the steering stroke range.

Figure 11:
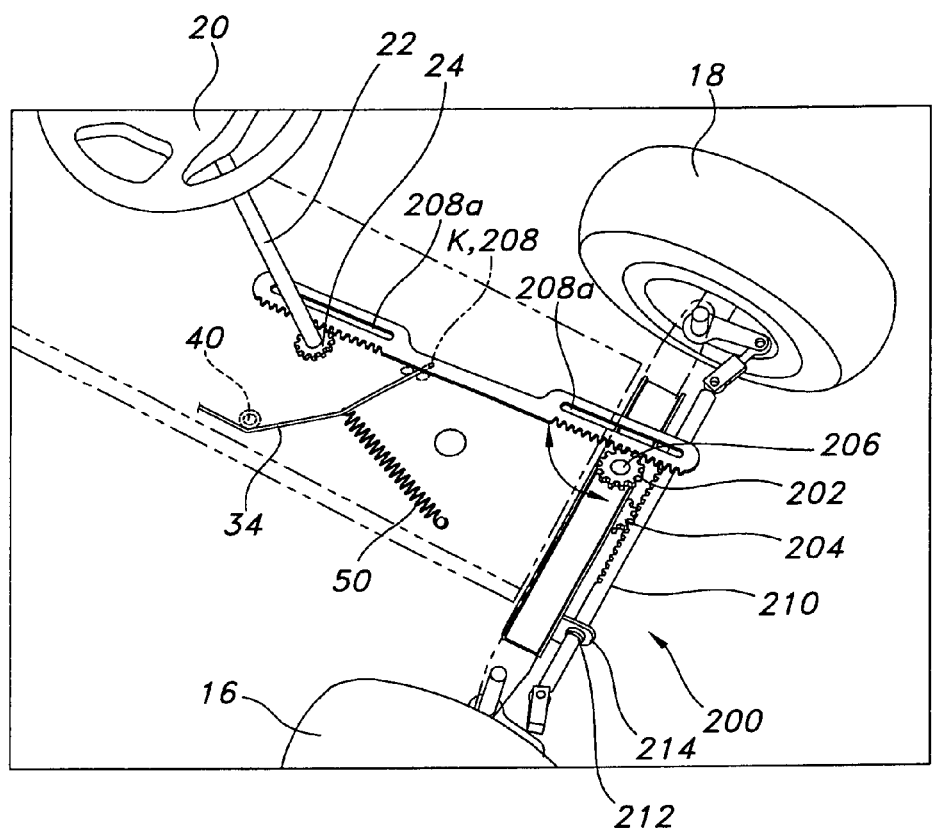
FIG. 11 is a perspective view of another type of steering system that may be used with the control system with slow-in-turn capabilities forming one aspect of the invention.
Figure 11A:
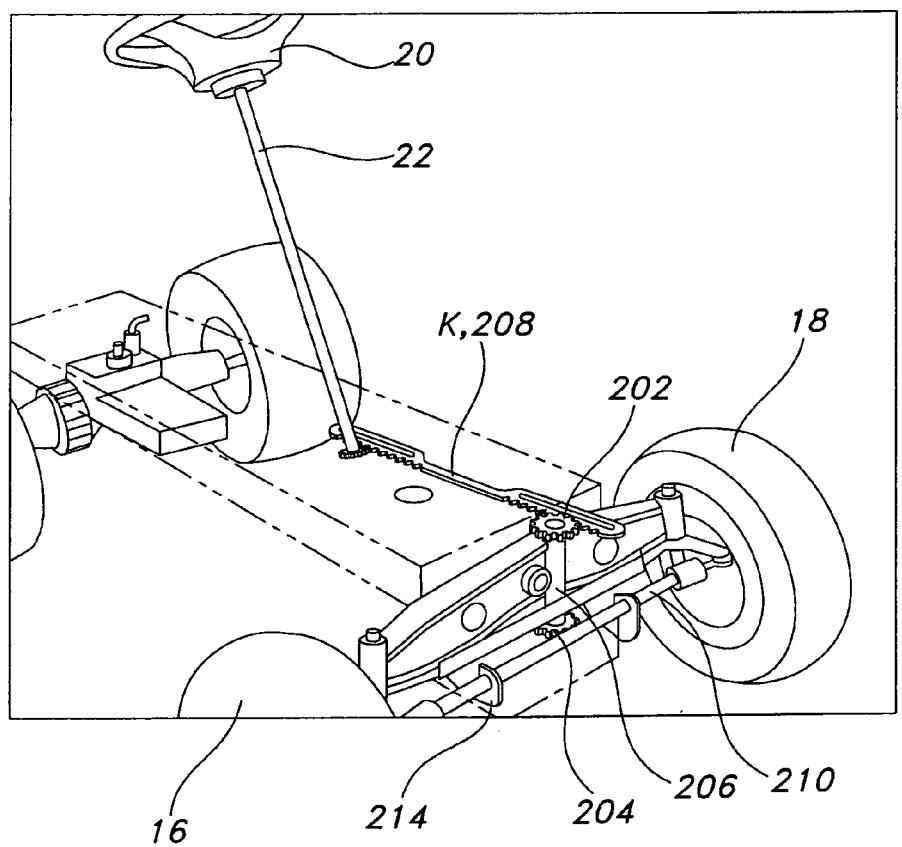
FIG. 11a is a front perspective view of the steering system of FIG. 11.
Figure 12:
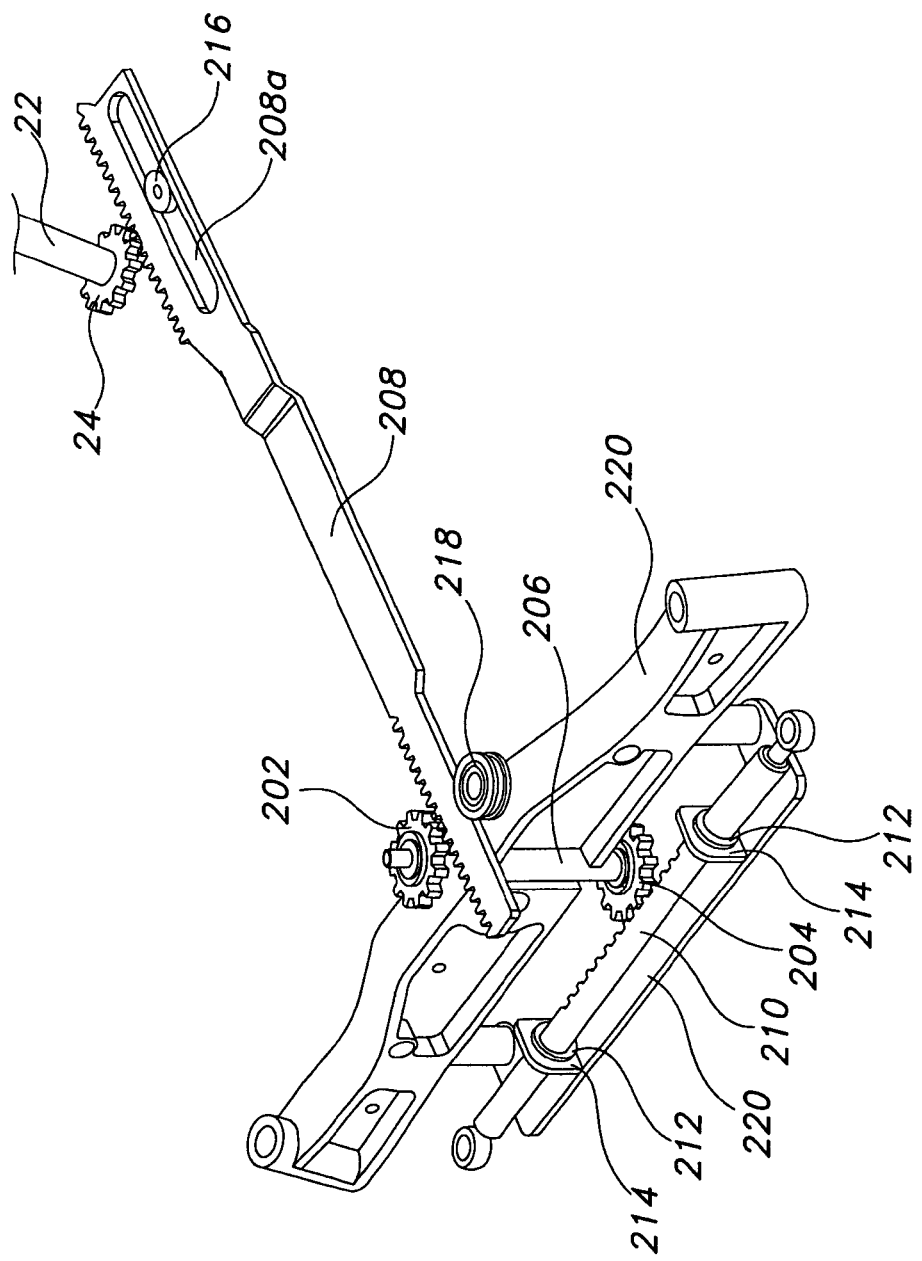
FIG. 12 is a perspective view of a steering system similar to that shown in FIG. 11 apart from the vehicle chassis.
Figure 13:
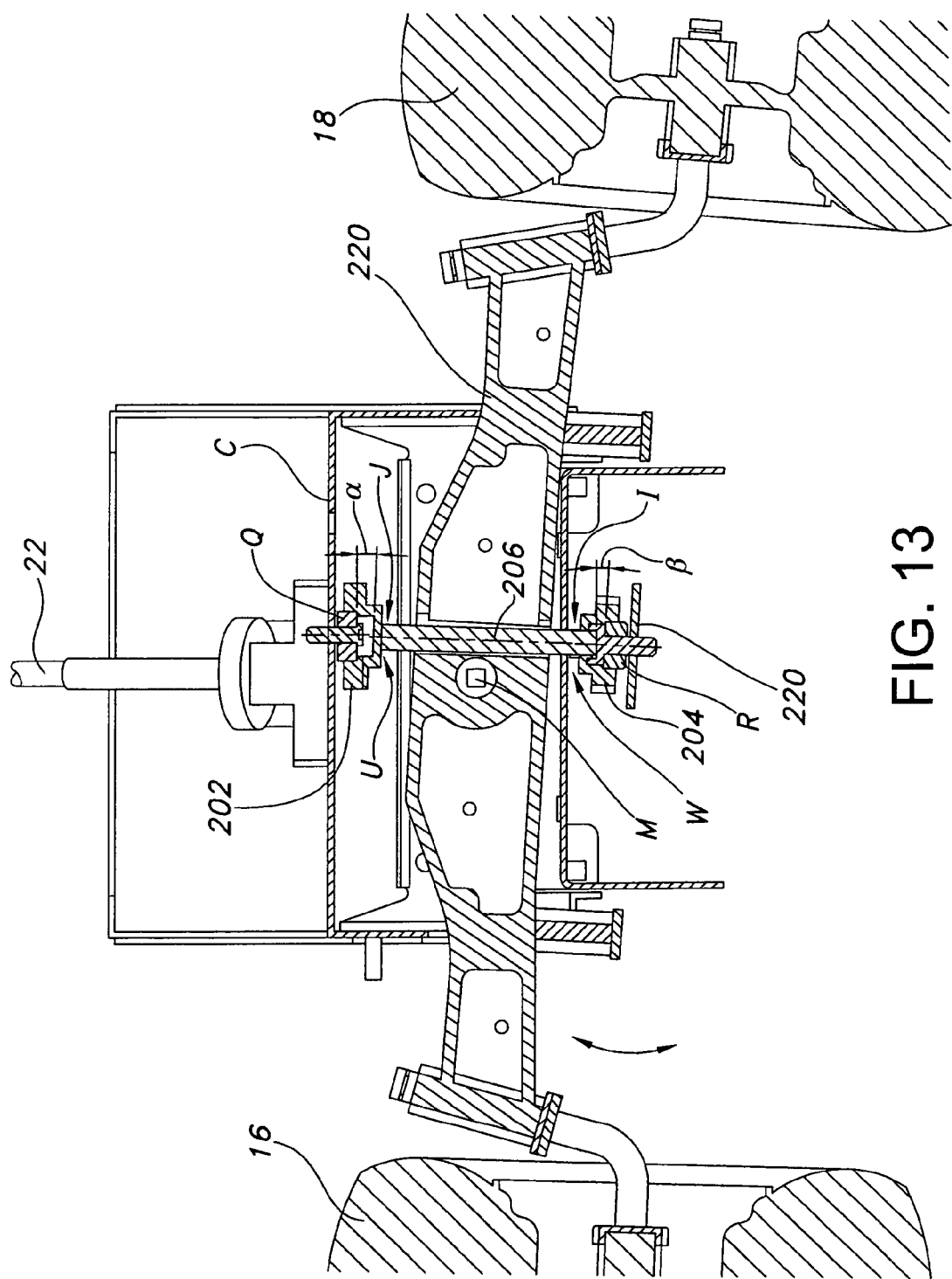
FIG. 13 is a front elevational, cross-sectional view showing the steering system of FIG. 11.

Another example of a steering system 200 is shown in FIGS. 11–13. This system 200 incorporates two different pinion gears 202 and 204 on a common axis of rotation defined by a spindle 206 to engage two different racks 208, 210 positioned for movement in different horizontal planes. The first rack 208 is engaged at one end by a third pinion 24 carried by the shaft 22 that supports the steering wheel 20 and engages the first pinion 202 at the opposite end. The third pinion 24 be of the helical variety, as shown in FIG. 12, for engaging the teeth on rack 208. Hence, as a result of turning the steering wheel 20, the first linkage 208 is moved to and fro in a first, generally longitudinal direction, which in turn rotates the first pinion 202. This causes the spindle to rotate 206 and turn the second pinion 204 carried thereby in the same direction. Since this pinion 204 is in engagement with the second rack 210, it is moved laterally in a corresponding direction and, via knuckles, steers or turns the wheels 16, 18.

The first rack 208 as illustrated includes slots 208a for receiving support bushings (not shown) that allow it to translate in the longitudinal direction and keep it in engagement with pinions 24, 202. However, one or more bearings or rollers could also be used for this purpose, as shown in FIG. 10. Also, the second rack 210 is shown as being in the form of a bar having gear teeth formed in the side adjacent to the corresponding pinion 204. The ends of the second rack 210 are supported by bushings 212 carried in brackets 214 supported by the frame or chassis C. This mounting arrangement both permits the second rack 210 to translate laterally and remain in engagement with the second pinion 204.

However, the use of a support arrangement like the one shown in FIG. 10 is also possible.

FIG. 12 illustrates a hybrid approach where the first rack 208 includes a slot 208a at one end for receiving a support bushing 216 and is held in engagement with the first pinion 202 at the opposite end by a rotatably mounted roller bearing 218. FIGS. 12 and 13 also illustrate that the spindle 206 operatively connected to the pinions 202, 204 and may pass through and cooperate with the axle 220 supporting the front wheels 16, 18 of the vehicle, if necessary. The cooperation is preferably such that full oscillation of the axle 220 about point M remains possible. To insure that the pinions 202, 204 remain in aligned engagement with the corresponding racks 208, 210, mounting them relatively fixed in relation to the corresponding rack, such as via press fit to bearings Q and R supported by frame C and connected with a "floating" spindle 206 may be desirable. In the embodiment illustrated in FIG. 13, the first pinion 202 has an angular travel range of ±1.71° (note angle α) and the second pinion 204 has a relative travel range of ±1.54° relative to the spindle 206 during the full front axle oscillation stroke about pivot point M. The spindle 206 may have splines U and W on each end that engage with internal splines I and J incorporated into pinions 202 and 204 to formed a splined interface and form the operative connection. Unique spline profile provisions can be incorporated to accommodate misalignment between the spindle 206 and pinions 202, 204. Instead of splines, a spindle in the form of a shaft having a hexagonal cross-section for interfacing with the pinions 202, 204 could also be used (see FIG. 11).

Turning back to FIG. 11, it is also noted that the control system 10 with the slow-in-turn capability may be used with this type of steering system 200 by simply routing the chain through bearings shown in phantom and connecting one end of the chain 34 to the rack 208 at a particular location. The mounting location of the bearings may be chosen based on the desired degree of actuation of the steering system 200 that causes the slow-in-turn feature to activate. Means for supplying a holding force to keep the chain substantially taut in the non-activated condition, such as a spring 50, may also be provided. This modified or alternative type of control system 10 could also be used with the steering system 100 of FIG. 10.

Modifications to the various inventions disclosed herein are of course possible in view of the foregoing teachings. For example, while a hydrostatic transmission is shown, it is possible to use the control system 10 on a vehicle including a mechanical transmission having one or more belt-driven, variable speed pulleys of a type well-known in the art (see, e.g., U.S. Pat. Nos. 6,361,457, 5,897,450, and 4,941,863, the disclosures of which are incorporated herein by reference). One end of the flexible part would still be coupled or connected to the steering system, but the opposite end would engage a linkage, lever, or like structure for actuating the variable speed pulley(s) to slow the speed of travel when a turn is made, preferably beyond a predetermined range. Hence, the slow-in-turn function may be achieved automatically without an operator-controlled speed control device, such as a pedal or lever.

The control system 10 may be easily adapted to work with a vehicle V having a transmission that includes a speed control lever that is moved forward to effect forward movement and rearward to reverse the movement. The modification required may be as simple as adding an auxiliary linkage (not shown) between the speed control device, such as pedal 32, and the speed control linkage 30. The tightening of the flexible part to the activated condition would then move or pull the auxiliary linkage, which would then move or push the speed control linkage or other structure operatively connected to the speed control lever in the opposite direction to slow the vehicle.

Figure 14:
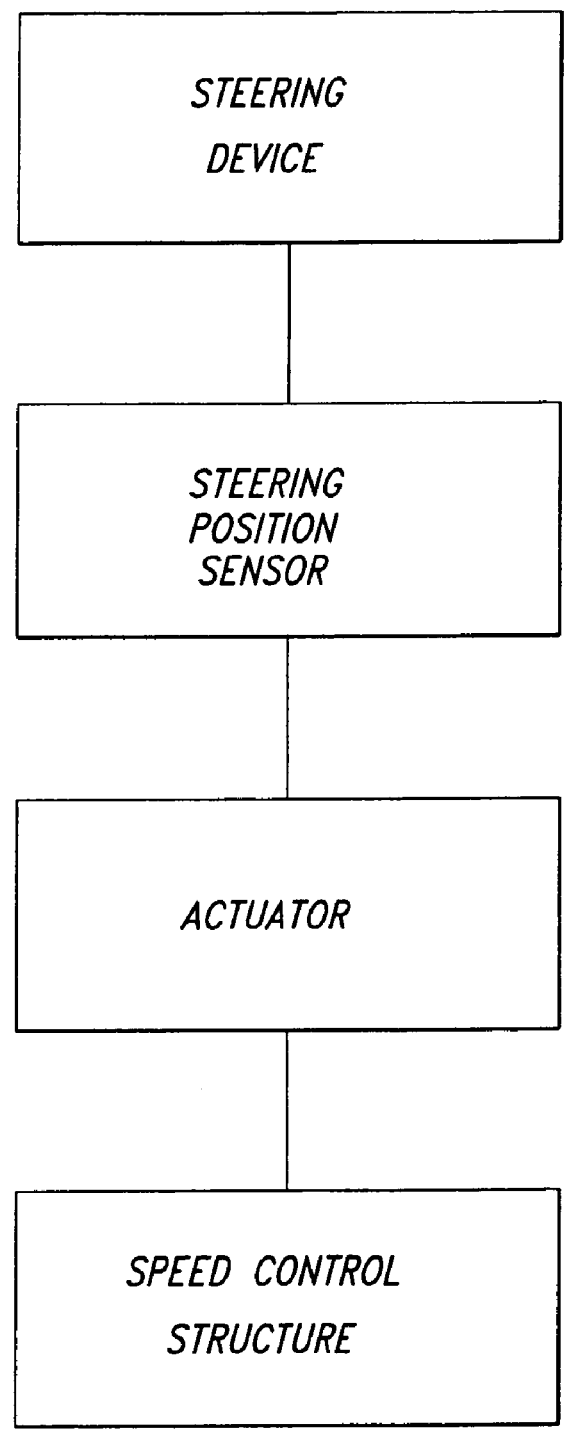
FIG. 14 is a schematic diagram of an alternate embodiment.

As schematically shown in FIG. 14, the control system 10 could also be modified to include a steering position sensor for determining the position of the steering device or wheel. The sensor may be any type of position sensor, such as an optical or inductive-type sensor, that allows for the position of the steering device to be determined (such as by monitoring the rotation of the shaft 22 or pinion 24), including within a predetermined range of movement (or perhaps even only when the movement is outside of a predetermined range; e.g., 75% to the left or right of center in either direction). An actuator or like motive device (e.g., a linear actuator or like device) could then be activated from a non-activated condition to make the speed adjustment to the transmission, such as by physically changing the position of the speed control structure (lever or variable speed pulley) via a corresponding speed control linkage or the like. This type of arrangement would also allow the slow-in-turn function to be achieved automatically without an operator-controlled speed control device, such as a pedal or lever.

Generally summarizing the foregoing, a very economical control system 10 with slow-in-turn capabilities is disclosed, along with two novel steering systems 100, 200. In one particularly preferred embodiment, a flexible chain 34 is operatively connected between the steering system S and the speed control linkage 30 associated with the transmission T. The chain 34 preferably only manipulates the speed control linkage 30 by assuming a tightened or activated condition near the extreme ends of the left and right steering stroke, which are considered outside or beyond a predetermined range. A holding means, such as a spring 50, may be provided to take up the slack in the chain during all other turning modes.

The system 10 can be applied to most existing variable speed transmissions, since it is essentially part of a linkage external to the transmission. A similar mechanism can also be adapted to control a variable speed belt drive of a mechanical transmission, and can also be adapted for use with a chassis having drive wheel type steering, as described in my co-pending PCT application Ser. No. PCT/US02/33086, the disclosure of which is incorporated herein by reference. This type of chassis would include one or more caster wheels opposite of the drive wheels.

The foregoing description of various aspects of the invention are presented for purposes of illustration and description. The description is not intended to be exhaustive or to limit the invention to the precise form disclosed. The embodiments chosen were described to provide the best application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. In a vehicle including a motive device for driving the vehicle at a speed corresponding to a speed control structure and a steerable ground-engaging structure for controlling a direction of vehicle travel, a system for intended use in temporarily reducing the speed of the vehicle, comprising:

a steering device for steering the vehicle including a steering wheel connected to a shaft and a pinion adapted for engaging a rack that moves to and fro corresponding to the movement of the steering wheel, including through a predetermined range;

a connector operatively connecting the steering device with the speed control structure, the connector including a flexible part assuming a first, non-activated condition when the steering device is actuated within the predetermined range such that the speed control structure is substantially unaffected and assuming a second, activated condition when the steering device is actuated beyond the predetermined range such that the speed control structure is automatically actuated to reduce the speed;

a bearing for engaging the flexible part in both the first and second conditions; and means for supplying a force for holding the flexible part substantially taut and in engagement with the bearing when in the first condition, wherein the holding force is overcome when the flexible part assumes the second condition.

2. The system according to claim 1, wherein the holding means is a spring extending between the flexible part and a stable support structure associated with the vehicle.

3. The system according to claim 1, further including an operator-actuated speed control device operatively connected to a speed control linkage forming part of the connector, the speed control linkage being operatively connected to the speed control structure of the motive device, wherein a second end of the flexible part is operatively connected to the speed control linkage.

4. The system according to claim 3, wherein the flexible part is capable of assuming the second, activated condition only when the speed control device is actuated at least a predetermined extent.

5. The system according to claim 4, wherein the flexible part is an elongated chain.

6. The system according to claim 1, wherein the predetermined range is about 75% to the right of a position of the steering device for straight ahead travel and about 75% to the left of the straight ahead travel position.

7. A vehicle, comprising:
a ground-engaging structure for controlling a direction of vehicle travel;
a motive device for driving the vehicle at a speed corresponding to a speed control structure associated therewith;
a movable steering device for steering the vehicle including a steering wheel connected to a shaft and a pinion adapted for engaging a rack moving to and fro corresponding to the movement of the steering wheel through a predetermined range;
a system for temporarily reducing the speed of the vehicle, the system including a connector operatively connecting the steering device with the speed control structure, the connector including a flexible part assuming a first, non-activated condition when the steering device is actuated within the predetermined range such that the speed control structure is substantially unaffected and assuming a second, activated condition when the steering device is actuated beyond the predetermined range such that the speed control structure is automatically actuated to reduce the speed;
at least one bearing for engaging the flexible part in both the first and second conditions; and
means for supplying a force for holding the flexible part substantially taut and in engagement with the at least one bearing in the first condition, wherein the force supplied by the holding means is overcome when the steering wheel is actuated beyond the predetermined range and the flexible part is in the second condition.

8. The vehicle according to claim 7, wherein the holding means is a spring extending between the flexible part and a stable support structure associated with the vehicle.

9. The vehicle according to claim 7, further including a speed control device operatively connected to a speed control linkage forming part of the connector, the speed control linkage being connected to the speed control structure and a second end of the flexible part being connected to the speed control linkage.

10. The system according to claim 9, wherein the flexible part is an elongated chain.

11. In a vehicle including a motive device for driving the vehicle at a speed corresponding to a speed control structure and a steerable ground-engaging structure for controlling a direction of vehicle travel, a speed control system, comprising:
operator-actuated means for steering the vehicle, including a steering wheel connected to a shaft and a pinion adapted for engaging a rack that moves to and fro corresponding to actuation of the steering wheel, including through a predetermined range, wherein the rack is operatively connected to the ground-engaging structure; and
means for temporarily reducing the speed of the vehicle by actuating the speed control structure to slow the vehicle when the steering means is actuated beyond the predetermined range wherein the speed reducing means comprises a connector operatively connecting the steering means with the speed control structure, the connector having a flexible part assuming a first, non-activated condition when the steering device is actuated within a predetermined range such that the speed control structure is substantially unaffected and assuming a second, activated condition when the steering wheel is actuated beyond the predetermined range such that the speed control structure is automatically actuated to reduce the speed;
at least one bearing for engaging the flexible part in both the first and second conditions; and
means for supplying a force for holding the flexible part substantially taut and in engagement with the at least one bearing in the first condition, wherein the force supplied by the holding means is overcome when the steering wheel is actuated beyond the predetermined range and the flexible part is in the second condition.

12. The system according to claim 11, further including a sensor for detecting whether the steering means is within the predetermined range, wherein the speed reducing means comprises an actuator operatively connected to the sensor and the speed control structure, the actuator assuming a first, non-activated condition when the steering device is actuated within a predetermined range such that the speed control structure is substantially unaffected and assuming a second, activated condition when the steering device is actuated beyond the predetermined range such that the speed control structure is automatically actuated to reduce the speed.

13. A vehicle, comprising:
a ground-engaging structure for controlling a direction of travel;
a motive device for driving the vehicle at a speed corresponding to a speed control structure associated therewith;
a steering device including a shaft carrying a pinion for engaging a rack mounted to the vehicle so as to move to and fro corresponding to the actuation of the steering device, including within a predetermined range;

means for controlling the speed of the vehicle by actuating the speed control structure to slow the vehicle only when the steering device is actuated beyond the predetermined range;

wherein the speed control means comprises a connector operatively connecting the steering device with the speed control structure, the connector having a flexible part assuming a first, non-activated condition when the steering device is actuated within a predetermined range such that the speed control structure is substantially unaffected and assuming a second, activated condition when the steering device is actuated beyond the predetermined range such that the speed control structure is automatically actuated to reduce the speed;

a bearing for engaging the flexible part in both the first and second conditions; and a means for holding the flexible part substantially taut and in engagement with the bearing when in the first condition, wherein the holding force is overcome when the flexible part assumes the second condition.

14. The vehicle according to claim 13, wherein the holding means is a spring extending between the flexible part and a stable support structure associated with the vehicle.

15. The vehicle according to claim 13, further including an operator-actuated speed control device operatively connected to a speed control linkage forming part of the connector, the speed control linkage being operatively connected to the speed control structure of the motive device, wherein a second end of the flexible part is operatively connected to the speed control linkage.

16. The vehicle according to claim 13, wherein the flexible part is capable of assuming the second, activated condition only when the speed control device is actuated at least a predetermined extent.

17. The vehicle according to claim 13, wherein the speed control means comprises a steering position sensor for determining the position of the steering device.

18. The vehicle according to claim 17, further including a transmission having speed control device, wherein the speed control means further comprises an actuator for adjusting the speed control device in response to the sensed position of the steering device.

19. The vehicle according to claim 13, wherein the flexible part is an elongated chain.

* * * * *